United States Patent [19]
Takekawa

[11] Patent Number: 5,923,134
[45] Date of Patent: Jul. 13, 1999

[54] METHOD AND DEVICE FOR DRIVING DC BRUSHLESS MOTOR

[75] Inventor: Yoriyuki Takekawa, Ohsato-gun, Japan

[73] Assignee: Zexel Corporation, Tokyo, Japan

[21] Appl. No.: 08/971,681

[22] Filed: Nov. 17, 1997

[30] Foreign Application Priority Data

Dec. 10, 1996 [JP] Japan .................................. 8-344471

[51] Int. Cl.$^6$ .................................................. H02P 5/28
[52] U.S. Cl. ......................................... 318/254; 318/809
[58] Field of Search .................................. 318/254, 439, 318/138, 799–805

[56] References Cited

U.S. PATENT DOCUMENTS

| | | | |
|---|---|---|---|
| 4,743,815 | 5/1988 | Gee et al. | 318/254 |
| 5,367,234 | 11/1994 | DiTucci | 318/254 |
| 5,631,999 | 5/1997 | Dinsmore | 388/805 |
| 5,640,073 | 6/1997 | Ikeda et al. | 318/439 |

FOREIGN PATENT DOCUMENTS

58-25038  5/1983  Japan .
8-80083   3/1996  Japan .

*Primary Examiner*—Brian Sircus
*Attorney, Agent, or Firm*—Pollock, Vande Sande & Amernick, R.L.L.P.

[57] ABSTRACT

A device for driving a DC brushless motor by outputting commutation control signals based on voltages induced in the drive windings includes a position detection circuit having low-pass filter circuits that remove a chopping frequency component and have a phase lag of 60–90° at maximum motor rotational speed, a rotational frequency computing section, and a phase correction amount computing section that effects a computation based on the rotational frequency computed by the rotational frequency computing section to set the commutation time point to produce a 30° phase lag in a rotational speed range in which the phase lag falls in the range of 0° to less than 30° and to produce a 90° phase lag in a rotational speed range in which the value of the phase lag falls in the range of 30–90°. The device achieves high efficiency at optimum commutation timing in the high rotational speed region and suppresses vibration and noise in the low rotational speed region.

8 Claims, 7 Drawing Sheets

METHOD AND DEVICE FOR DRIVING DC BRUSHLESS MOTOR

BACKGROUND OF THE INVENTION

1. Field of the Invention

The present invention relates to a method and a device for driving a direct current (DC) brushless motor wherein excitation current is supplied to the drive windings under duty ratio control, the rotational position of the rotor is detected based on voltages induced in the drive windings owing to rotor rotation, and commutation control is effected in accordance with the detected position.

2. Background Art

The prior art includes a DC brushless motor driving device which achieves so-called "sensorless operation" by effecting the required commutation control based on the rotational position of the rotor detected from voltages induced in the drive windings by rotor rotation. A configuration is also known for regulating the average voltage applied to the drive windings of a DC brushless motor by varying the duty ratio of a chopping signal. When an attempt is made to effect sensorless operation in a configuration that chops the voltage applied to the drive windings, however, the sensorless operation is hindered by the superimposition of the pulse signal for chopping on the voltage induced in the drive winding. Japanese Patent Application Publication No. Sho 58-25038 ('038) teaches a configuration for overcoming this difficulty by separating the two types of signal components with filters so as to enable sensorless operation to be conducted unaffected by the chopping signal.

The teaching of '038 is to obtain the voltages induced in the drive windings through first-order lag filters to remove the chopping frequency component associated with the duty ratio control, thereby obtaining signals wherein the timing of polarity inversion of the voltage level induced in the open phase is phase-delayed by 90°, and to use these signals for controlling the commutation of drive currents to the drive windings.

In an actual DC brushless motor driving device, however, other phase lag factors are also present in addition to the phase lag produced by the first-order lag filters. For instance, a certain time lag not dependent on the rotational frequency occurs, while the inductance components of the drive winding coils delay the rise of the motor current after current switching. These phase lag factors produce commutation lag that tends to become particularly pronounced and degrade motor efficiency in the high speed region. Moreover, since effecting commutation with the timing of the polarity inversion delayed by 90° as taught by '038 results in commutation by use of signals for one phase earlier, the control is not optimum with respect to motor rotation and, particularly in the low speed region where inertial force is small, is likely to cause fluctuating rotation and vibrational noise.

To cope with these problems, Japanese Patent Application Public Disclosure No. Hei 8-80083 teaches a digital control method that enables the commutation control to be effected at a timing delayed by 30°. Since this digital method can discriminate the induced voltages in the drive windings only when the chopping signal is on, however, it cannot always effect commutation with optimum timing. To avoid this problem, the chopping frequency must be made variable, but this requires complex, high-cost circuitry.

SUMMARY OF THE INVENTION

One object of the invention is therefore to provide a method and a device for driving a DC brushless motor that overcome the aforesaid shortcomings of the prior art.

Another object of the invention is to provide a method and a device for driving a DC brushless motor that achieves high efficiency at optimum commutation timing in the high rotational speed region and suppresses vibration and noise in the low rotational speed region by effecting commutation matched to the motor rotation.

For achieving these objects, this invention provides a method for driving a DC brushless motor having a magnetic rotor and drive windings by supplying the drive windings with chopped drive currents commutated based on voltages induced in the drive windings by magnetic rotor rotation, the method comprising a step of obtaining voltage signals representing the induced voltages at a phase lag of 60–90° at maximum rotational speed of the DC brushless motor by passing the induced voltages through low-pass filter means to suppress voltage components occurring due to the chopped drive currents, a step of deriving rotational position data regarding the magnetic rotor from the voltage signals obtained in the obtaining step, a step of setting an optimum time point for commutating the chopped drive currents based on the rotational position data, rotational speed of the DC brushless motor and data regarding a phase lag characteristic of the low-pass filter means, and a step of commutating the chopped drive currents at the time point set in the setting step.

The phase lag of the induced voltage components obtained from the low-pass filter means are dependent on the instantaneous rotational speed of the DC brushless motor. The value of the instantaneous phase lag of the induced voltage components obtained from the low-pass filter means can therefore be found from the rotational speed and the phase lag characteristic of the low-pass filter means and the optimum commutation time point can be set based on this value.

The optimum commutation time point is set based on the so-obtained value of the phase lag of the induced voltages generated in the drive windings. The optimum commutation time point can, for example, be set in the rotational speed range in which the value of the phase lag falls in the range of 0° to less than 30° by calculating the commutation time point that produces a 30° phase lag and be set in the rotational speed range in which the value of the phase lag falls in the range of 30–90° by calculating the commutation time point that produces a 90° phase lag.

Another aspect of the invention provides a device for driving a DC brushless motor having a magnetic rotor and drive windings by outputting commutation control signals for controlling commutation of chopped drive currents supplied to the drive windings based on voltages induced in the drive windings by magnetic rotor rotation, the device comprising low-pass filter circuits responsive to voltages obtained from the drive windings and having a phase lag characteristic enabling suppression of a voltage component of the obtained voltages associated with the chopped drive currents and output voltage signals representing induced voltage components at a phase lag of 60–90° at maximum rotational speed of the DC brushless motor, a pulse signal output circuit responsive to an output of the low-pass filter circuit for outputting multiple pulse signals representing rotational position data regarding the magnetic rotor, speed computing means responsive to an output of the pulse signal output circuit for computing a rotational speed of the DC brushless motor, commutation time point setting means responsive to outputs of the speed computing means and the pulse signal output circuit for setting an optimum time point for controlling commutation based on data regarding the phase lag characteristic, and control signal output means responsive to an output of the commutation time point setting means for outputting the commutation control signals.

Of the voltage components present in the drive windings, the low-pass filter circuits output only the voltage components induced by rotation of the magnetic rotor. These induced voltage components include a phase lag that is a function of the instantaneous rotational speed of the DC brushless motor. Data regarding the phase lag characteristic defining the relationship between the rotational speed and the phase lag are known beforehand. The commutation time point setting means can use these data to learn the phase lag corresponding to the instantaneous rotational speed computed by the speed computing means. The optimum commutation time point is set based on the so-obtained value of the phase lag of the induced voltages generated in the drive windings. The optimum commutation time point can, for example, be set in the rotational speed range in which the value of the phase lag falls in the range of 0° to less than 30° by calculating the commutation time point that produce a 30° phase lag and be set in the rotational speed range in which the value of the phase lag falls in the range of 30–90° by calculating the commutation time point that produce a 90° phase lag.

The control signal output means outputs commutation control signals for controlling commutation in accordance with the commutation time point data set by the commutation time point setting means. Commutation of the drive currents supplied to the drive windings is effected based on these commutation control signals. Therefore, in the low-speed region, where the phase lag is small, the result of the detected rotational position of the magnetic rotor can be quickly reflected in the setting of the commutation time point for commutation control. This makes occurrence of fluctuating rotation unlikely even when inertial force is small owing to low rotational speed.

DETAILED DESCRIPTION OF THE PREFERRED EMBODIMENT

Figure 1:
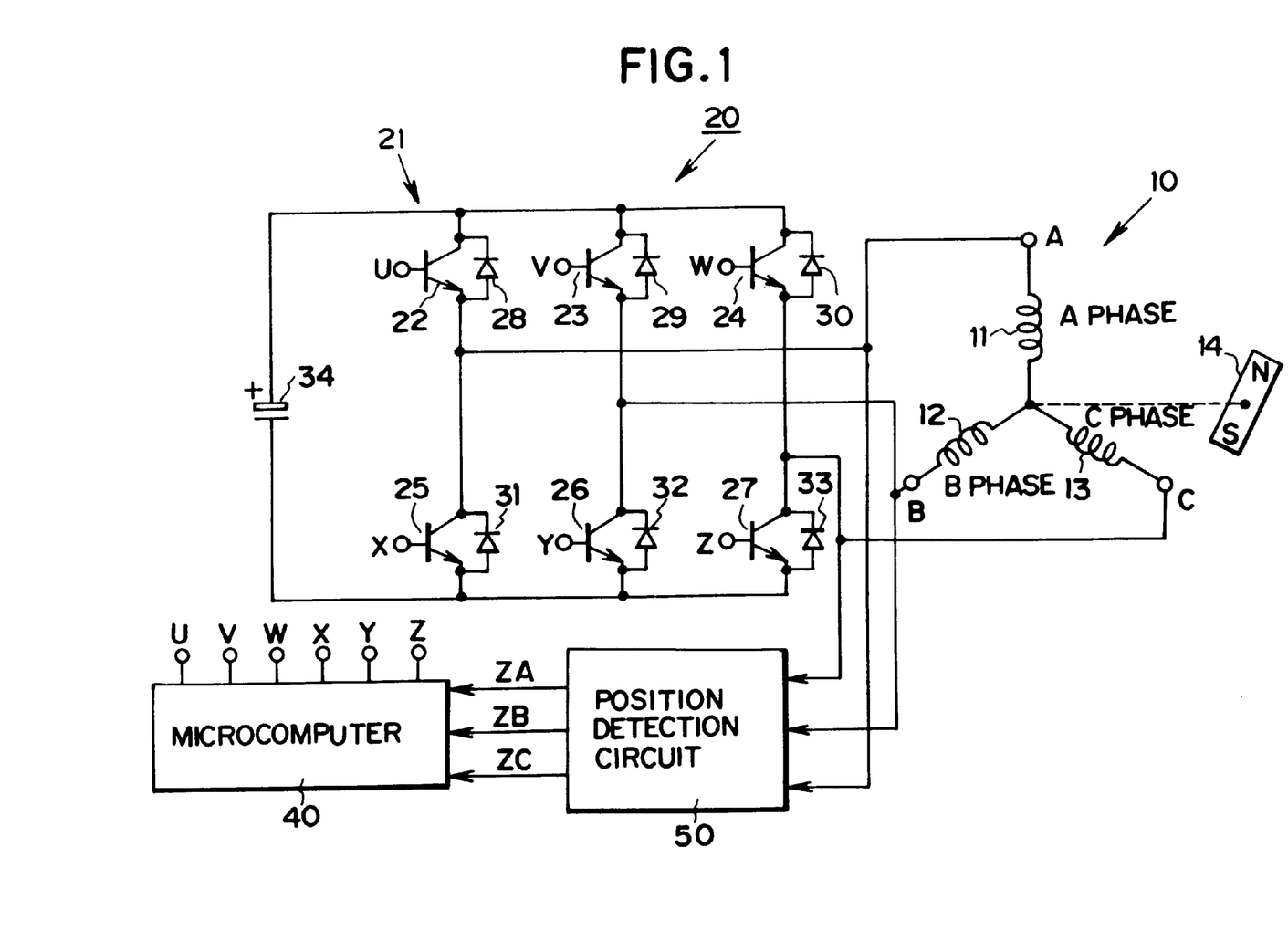
FIG. 1 is a diagram showing the general configuration of a device for driving a direct current brushless motor according to the invention.

As shown in FIG. 1, a three-phase, Y-connected, two-pole DC brushless motor 10 has an A-phase drive winding 11, a B-phase drive winding 12, a C-phase drive winding 13 and a two-pole permanent magnet rotor 14. Since the DC brushless motor 10 is of conventional configuration, its structure will not be described in detail here.

The DC brushless motor 10 is driven by a DC brushless motor drive device 20 according to this invention. The DC brushless motor drive device 20 is equipped with a commutator section 21 for commutating drive currents to the drive windings 11–13. As illustrated, the commutator section 21 comprises switching transistors 22–27 and diodes 28–33 connected in the conventional manner. Commutation control signals U–Z from a microcomputer 40 (explained later) are applied to the bases of the switching transistors 22–27. The switching transistors 22–27 are turned ON/OFF by the commutation control signals U–Z so as to commutate drive currents supplied to the drive windings 11–13 from a DC power source 34 and thereby rotate the permanent magnet rotor 14.

The DC brushless motor drive device 20 also has a position detection circuit 50 that discriminates the rotational position of the permanent magnet rotor 14 from the voltages induced in the drive windings 11–13 owing to the rotation of the permanent magnet rotor 14 and outputs the detection result to the microcomputer 40 rotor as position pulse signals ZA, ZB, ZC.

Figure 2:
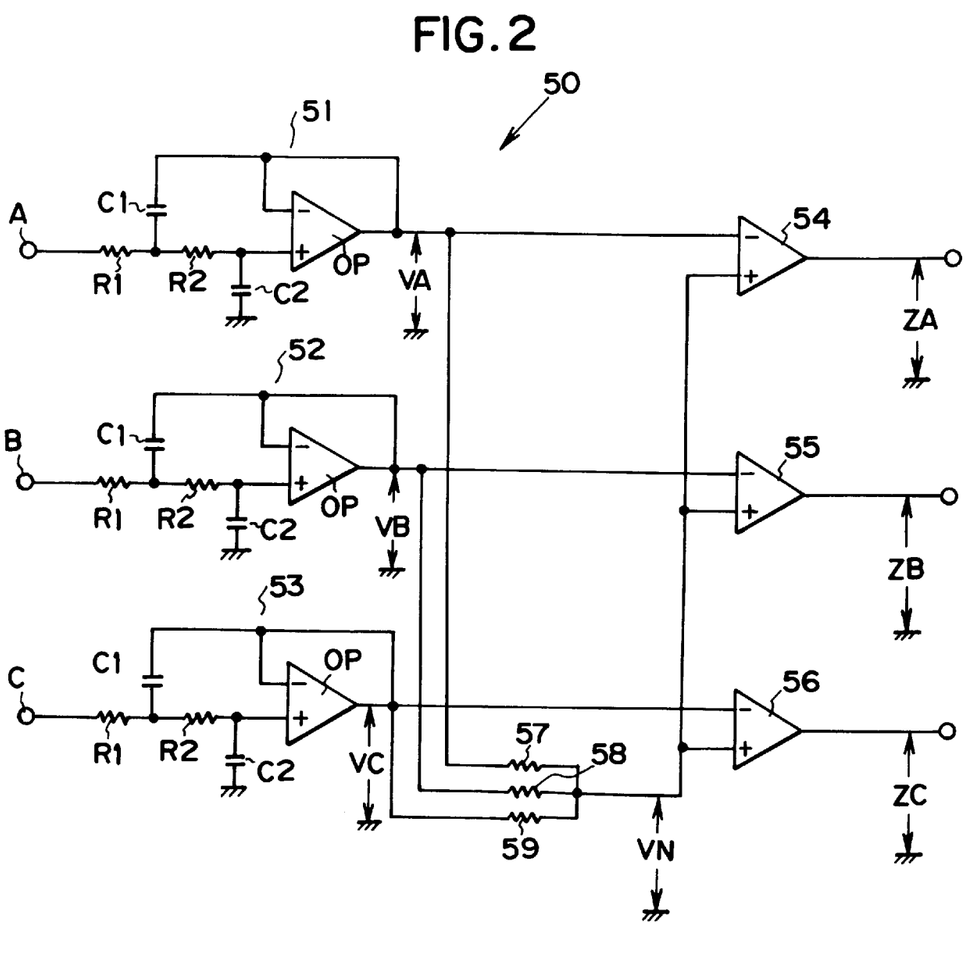
FIG. 2 is a detailed circuit diagram showing the position detection circuit of FIG. 1.

FIG. 2 is a detailed circuit diagram of the position detection circuit 50. The position detection circuit 50 has a low-pass filter circuit 51 input with voltage from the terminal A of the A-phase drive winding 11. In this embodiment, the low-pass filter circuit 51 is a second-order lag active filter composed of an operational amplifier OP, resistors R1, R2 and capacitors C1, C2 connected in the illustrated manner.

Figure 3A:
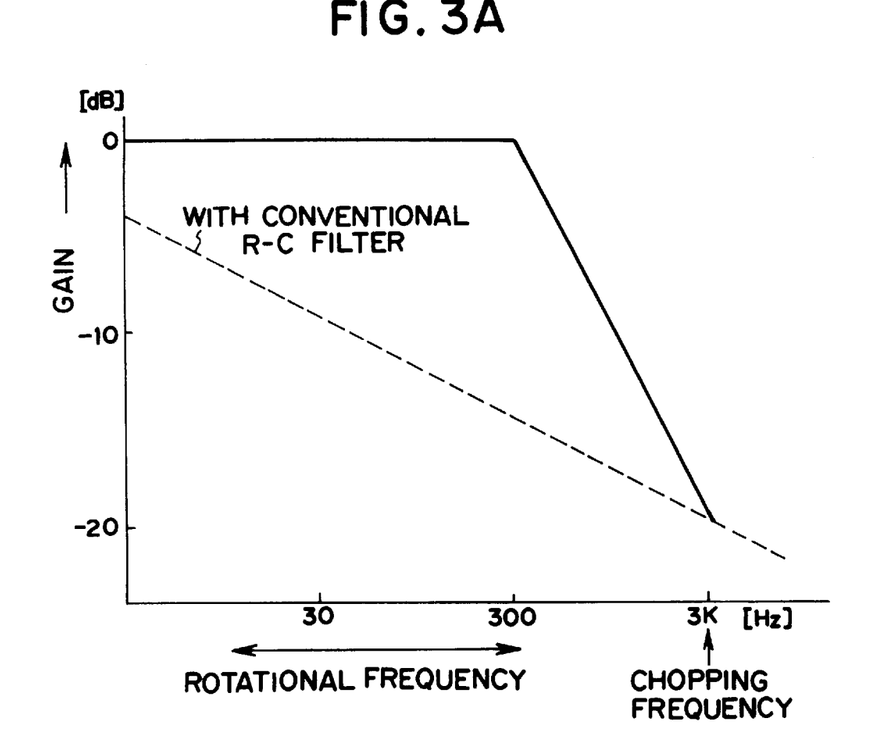
FIG. 3A is a graph showing the frequency-vs-gain characteristic of the low-pass filter circuit of FIG. 2.
Figure 3B:
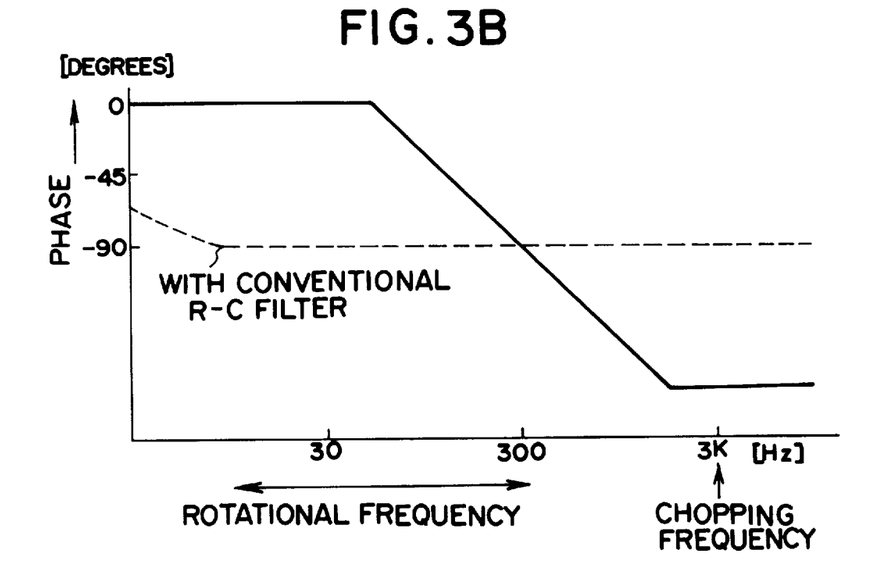
FIG. 3B is a graph showing the frequency-vs-phase characteristic of the low-pass filter circuit of FIG. 2.

FIG. 3A shows the frequency-vs-gain characteristic of the low-pass filter circuit 51 and FIG. 3B shows the frequency-vs-phase lag characteristic thereof. As shown in FIG. 3A, the gain of the low-pass filter circuit 51 exhibits substantially 0 dB loss up to 300 Hz, the rotational frequency of the DC brushless motor 10 at its maximum speed, and then decreases at a prescribed rate above 300 Hz. In this embodiment, the chopping frequency of the drive currents supplied to the DC brushless motor drive device 20 is set at 3 KHz. The frequency-vs-gain characteristic of the low-pass filter circuit 51 ensures fully adequate attenuation with respect to the 3-KHz signal component. On the other hand, the input-output phase lag characteristic of the low-pass filter circuit 51 in FIG. 3B shows that the phase lag is substantially zero up to the rotational frequency in the medium speed region of the DC brushless motor drive 10, whereafter it increases with increasing rotational speed to become 90° at 300 Hz, which is the rotational frequency of the DC brushless motor 10 at its maximum speed. In FIGS. 3A and 3B, the lateral axes representing frequency are logarithmically scaled.

The low-pass filter circuit 51 removes almost all of the chopping frequency component from the voltage appearing at the terminal A of the A-phase drive winding 11. The voltage component appearing at the terminal A owing to the rotation of the permanent magnet rotor 14 can therefore be obtained with the level of the chopping frequency component held to an extremely low level. The phase lag of the voltage signal VA obtained from the low-pass filter circuit 51 is a function of the instantaneous rotational speed of the DC brushless motor 10.

The voltage appearing at the terminal B of the B-phase drive winding 12 and the voltage appearing at the terminal C of the C-phase drive winding 13 are input to a low-pass filter circuit 52 and a low-pass filter circuit 53. Since the low-pass filter circuits 52 and 53 are configured identically to the low-pass filter circuit 51, components thereof corresponding to those of the low-pass filter circuit 51 are assigned the same reference symbols as those of low-pass filter circuit 51 and will not be explained again. The low-pass filter circuit 52 obtains the voltage appearing at the terminal B and outputs a voltage signal VB associated with the rotation of the permanent magnet rotor 14. The low-pass filter circuit 53 obtains the voltage appearing at the terminal C and outputs a voltage signal VC associated with the rotation of the permanent magnet rotor 14.

The voltage signal VA is applied to the negative input terminal of a voltage comparator 54, the voltage signal VB to the negative input terminal of a voltage comparator 55, and the voltage signal VC to the negative input terminal of a voltage comparator 56. The positive input terminals of the voltage comparators 54, 55 and 56 are connected together and the voltage signals VA, VB and VC are applied thereto through resistors 57, 58 and 59, respectively. The voltage applied to the positive input terminals of the voltage comparators 54, 55 and 56 is therefore a virtual neutral voltage VN obtained by summing the voltages through the resistors 57, 58 and 59. The voltage signals VA, VB and VC are compared in level with the virtual neutral voltage VN in the voltage comparators 54, 55 and 56. The voltage comparators 54, 55 and 56 therefore each outputs a rotor position pulse signal ZA, ZB or ZC of a high level only when the level at the negative input terminal thereof is lower than the virtual neutral voltage VN.

Figure 4:
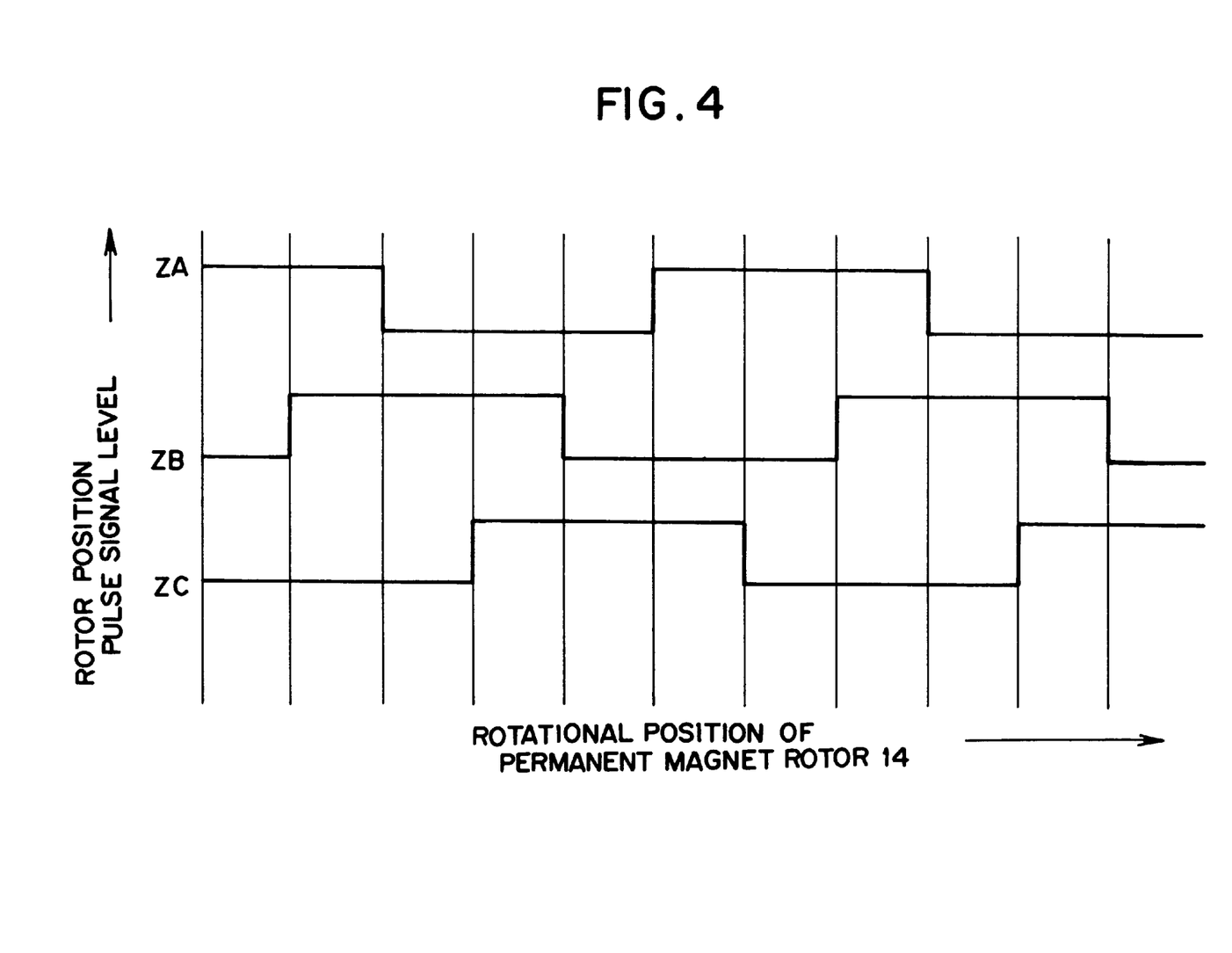
FIG. 4 is a waveform diagram of a set of rotor position pulse signals obtained from the position detection circuit.

FIG. 4 shows an example of the waveforms of the rotor position pulse signals ZA, ZB and ZC. The level change points of these waveforms are known to indicate the time points at which the permanent magnet rotor 14 comes opposite the corresponding drive windings. In other words, the rotor position pulse signals ZA, ZB and ZC include information (data) regarding the rotational position of the permanent magnet rotor 14. The rotor position pulse signals ZA, ZB and ZC are input to the microcomputer 40. The microcomputer 40 sets the optimum commutation time point based on the data regarding the rotational position of the permanent magnet rotor 14 carried by the rotor position pulse signals ZA, ZB and ZC, rotational frequency data associated with the rotational speed of the permanent magnet rotor 14, and the phase lag characteristic shown in FIG. 3B. The microcomputer 40 outputs a set of commutation control signals U–Z at the optimum commutation time point set in this manner.

Figure 5:
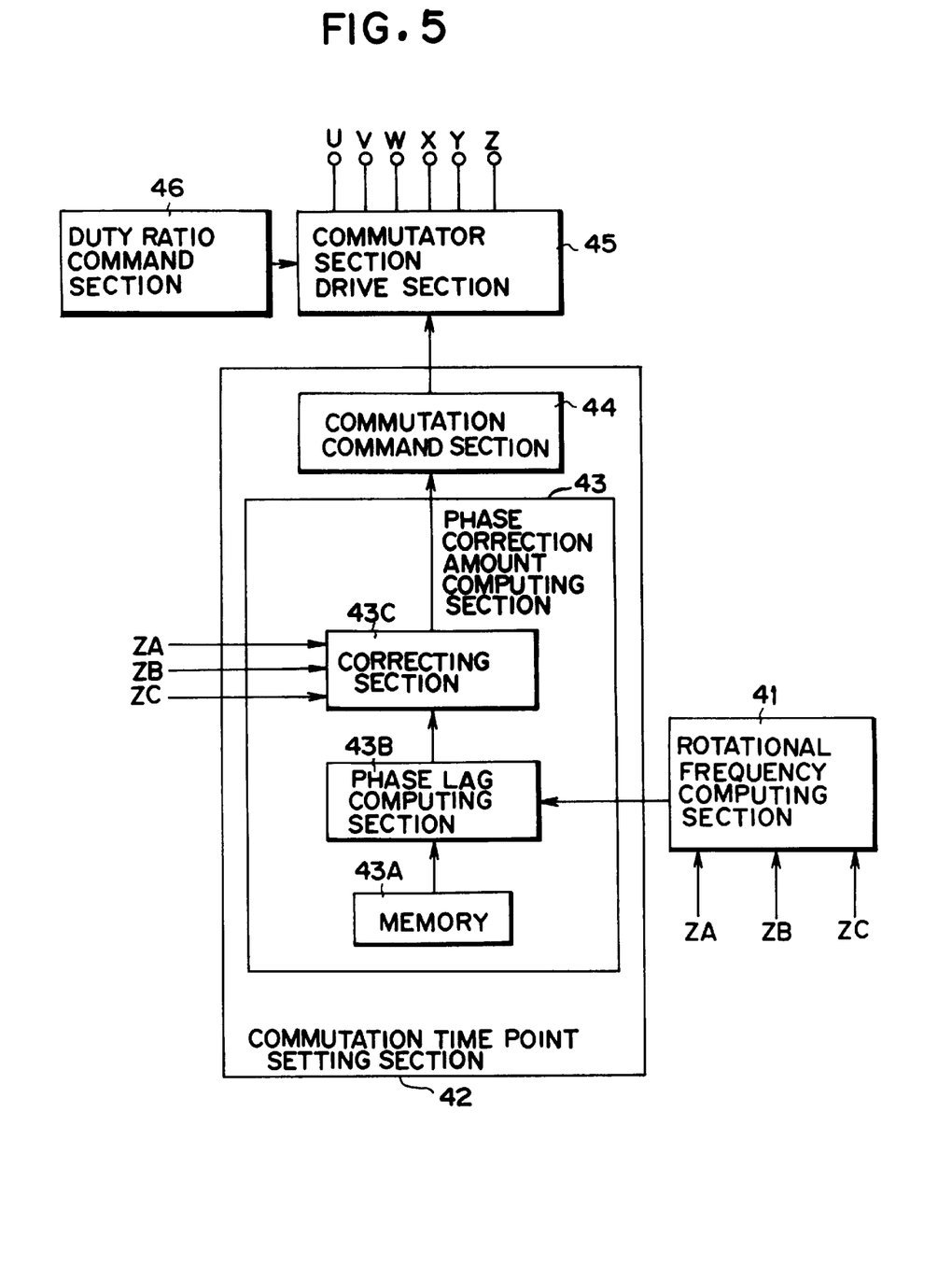
FIG. 5 is a functional block diagram showing a configuration in the microcomputer shown in FIG. 1 for processing the rotor position pulse signals.

FIG. 5 is a functional block diagram showing a configuration in the microcomputer 40 for processing the rotor position pulse signals ZA, ZB and ZC. The rotor position pulse signals ZA, ZB and ZC are input to a rotational frequency computing section 41 that computes the instantaneous rotational speed of the permanent magnet rotor 14. Rotational frequency data obtained from the computed rotational speed are sent to a commutation time point setting section 42.

The commutation time point setting section 42 includes a phase correction amount computing section 43 responsive to the rotational frequency data from the rotational frequency computing section 41 and the rotor position pulse signals ZA, ZB and ZC for correcting the level change time points of the rotor position pulse signals ZA, ZB and ZC in accordance with the instantaneous rotational speed of the permanent magnet rotor 14.

The phase correction amount computing section 43 is provided with a phase lag computing section 43B and a memory 43A for storing data corresponding to the frequency-vs-phase characteristic shown in FIG. 3B. The phase lag computing section 43B receives the rotational frequency data from the rotational frequency computing section 41 and, based thereon and data retrieved from the memory 43A, computes the instantaneous phase lag in the low-pass filter circuits 51–53.

Data representing the result of the computation in the phase lag computing section 43B are forwarded to a correcting section 43C which also receives the rotor position pulse signals ZA, ZB and ZC. When the phase lag computed by the phase lag computing section 43B is less than 30°, the correcting section 43C corrects the significant level change time points of the rotor position pulse signals ZA, ZB and ZC so that the commutation time point becomes a time point delayed 30° in phase from the significant level change points of the rotor position pulse signals ZA, ZB and ZC at the inputs of the low-pass filter circuits 51–53. The commutation time point is set in accordance with the result of this correction. When the phase lag computed by the phase lag computing section 43B is between 30° and less than 90°, the correcting section 43C corrects the significant level change time points of the rotor position pulse signals ZA, ZB and ZC so that the commutation time point becomes a time point delayed 90° in phase from the significant level change points of the rotor position pulse signals ZA, ZB and ZC at the inputs of the low-pass filter circuits 51–53. The commutation time point is set in accordance with the result of this correction.

In other words, when it is found from the phase lag characteristic shown in FIG. 3B and the instantaneous rotational frequency of the DC brushless motor 10 that the phase lag of the rotor position pulse signals ZA, ZB, ZC is smaller than 30°, the phase correction amount computing section 43 sets the commutation time point to lag 30° in phase after the significant level change time points of the rotor position pulse signals ZA, ZB and ZC, while when it is found that the phase lag of the rotor position pulse signals ZA, ZB and ZC is between 30° and less than 90°, the phase correction amount computing section 43 sets the commutation time point to lag 90° in phase after the significant level change time points of the rotor position pulse signals ZA, ZB and ZC.

The phase correction amount computing section 43 sends commutation time point data indicative of the set commutation time point to a commutation command section 44 which outputs timing data indicative of the commutation timing to a commutator section drive section 45.

A duty ratio command section 46 produces and forwards to the commutator section drive section 45 duty ratio command data designating the duty ratio of the chopping signal for chopping the drive currents in order to adjust the average voltage applied to the drive windings 11, 12 and 13. The commutator section drive section 45 outputs commutation control signals U, V, W, X, Y, Z in response to the duty ratio command data and the timing data from the commutation command section 44.

The data processing according to the functional block diagram of FIG. 5 is implemented by causing the microcomputer 40 to execute a program for this purpose.

Since the hardware configuration of the microcomputer 40 indicated in FIG. 1 is well known, it will not be explained in detail here.

Figure 6:
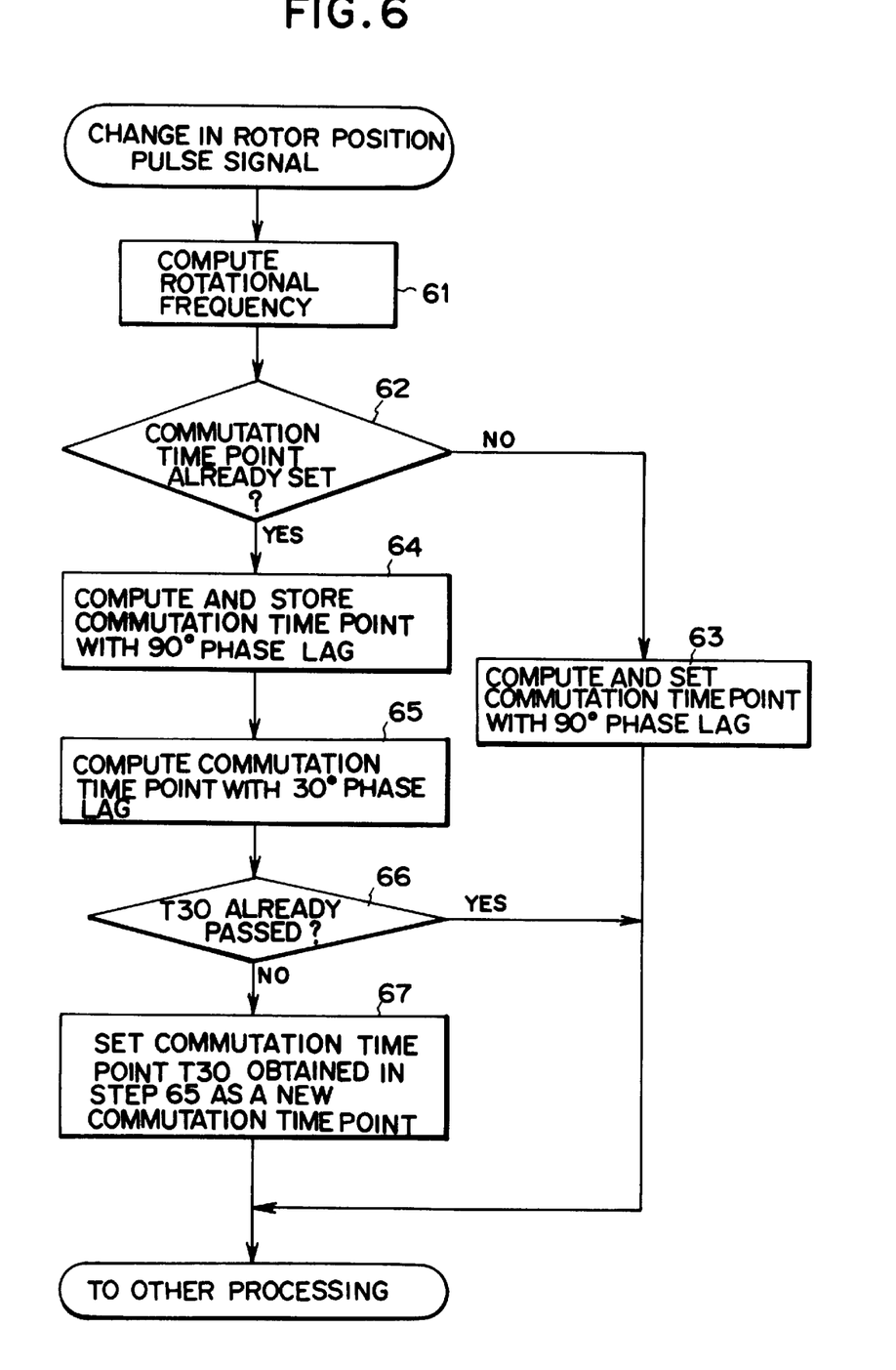
FIG. 6 is a flow chart showing a commutation time point setting program the microcomputer of FIG. 1 executes to set a commutation time point for commutation control.

A flow chart representing the commutation time point setting program executed by the microcomputer 40 is shown in FIG. 6. The commutation time point setting program shown in FIG. 6 is activated in response to a level change occurring in one of the input rotor position pulse signals ZA, ZB and ZC. First, in Step 61, the rotational frequency of the DC brushless motor 10 is computed from the time interval between level changes of the rotor position pulse signal ZA, ZB or ZC. The computation in Step 61 corresponds to the computation in the rotational frequency computing section 41 of FIG. 5. Next, in Step 62, it is checked whether a commutation time point has already been set.

If a commutation time point has not been set, the result in Step 62 is NO and control passes to Step 63. Step 63 computes and sets a commutation time point based on the level change time point of the rotor position pulse signal ZA, ZB or ZC, the rotational frequency computed in Step 61 and a phase correction amount calculated from the phase lag characteristic of the low-pass filter circuits 51–53. Since Step 63 is executed when Step 62 finds that no commutation time point has been set, the computation in Step 63 is effected to set a commutation time point with 90° phase lag. The computation is made in the manner explained regarding the phase correction amount computing section 43 in FIG. 5. Once a commutation time point has been set in accordance with the computation result, execution of Step 63 is terminated and other processing is effected.

When the result of the check in Step 62 is YES, control passes to Step 64. Step 64 computes a commutation time point with 90° phase lag and stores a commutation time point in accordance with the computation result. The following Step 65 then computes a commutation time point with 30° phase lag. The computation of the commutation time point with 30° phase lag is made in the manner explained regarding the phase correction amount computing section 43 in FIG. 5.

Next, in Step 66, the commutation time point with 30° phase lag T30 computed in Step 65 is compared with the current time point TN and a discrimination is made to determine whether the commutation time point T30 has already passed. If the commutation time point T30 has already passed, the result in Step 66 is YES and the program moves on to other processing without setting the commutation time point computed in Step 65. If the commutation time point T30 has not yet passed, the result in Step 66 is NO and control passes to Step 67. Step 67 sets the commutation time point with 30° phase lag computed in Step 65 as the new commutation time point in place of the commutation time point with 90° phase lag computed and stored in Step 64, whereafter the program moves on to other processing.

Figure 7:
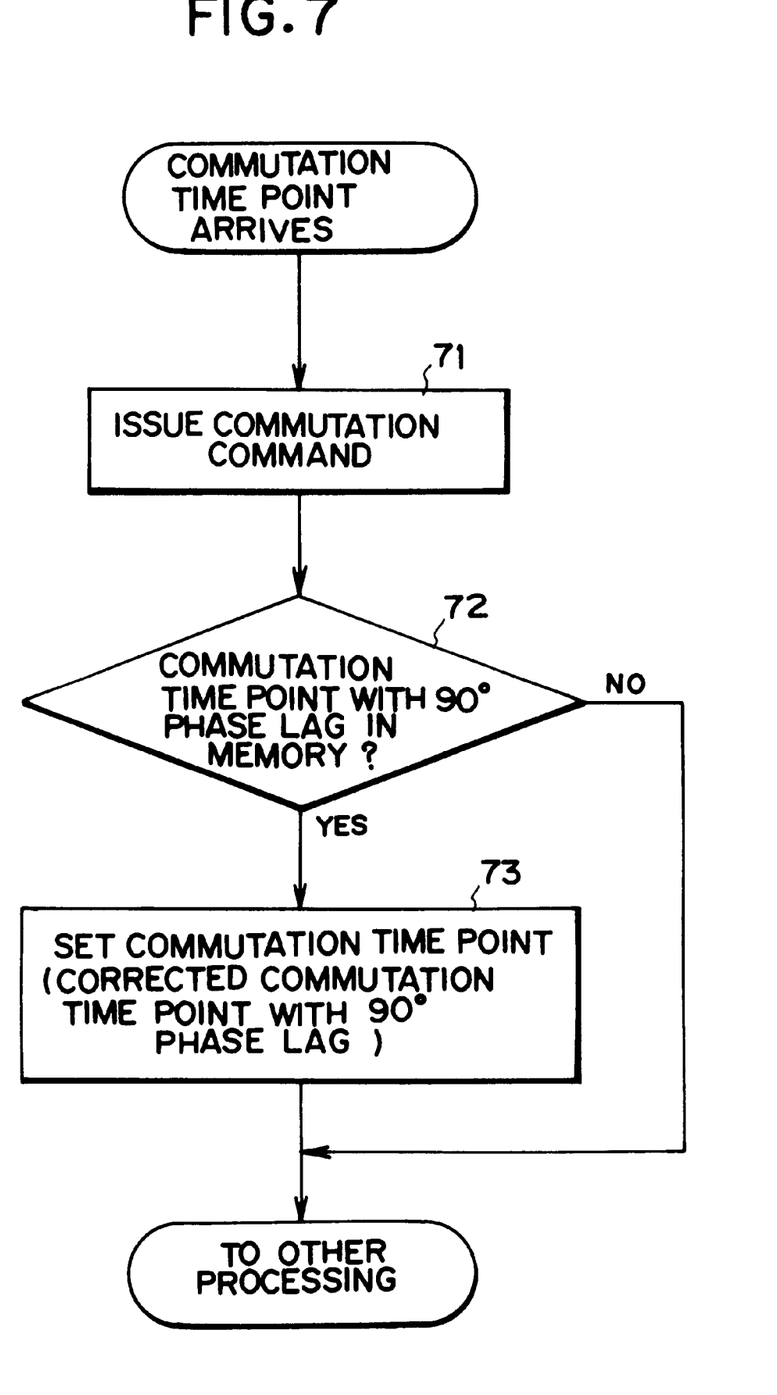
FIG. 7 is a flow chart showing a commutation control program the microcomputer of FIG. 1 executes to control commutation at the commutation time point set by the commutation time point setting program of FIG. 6.

Commutation control is effected when the commutation time point set in accordance with the flow chart of FIG. 6 arrives. The processing for this will now be explained with reference to the flow chart of FIG. 7. The commutation control program shown in FIG. 7 is activated upon the arrival of the commutation time point set in accordance with the flow chart of FIG. 6. First, in Step 71, a commutation command is issued to output a set of commutation control signals U, V, W, X, Y, Z under the control of a commutation signal generating program (not shown).

Next, in Step 72, it is checked whether a commutation time point with 90° phase lag is stored in memory. If a commutation time point with 90° phase lag is stored in memory, the result in Step 72 is YES and control passes to Step 73, where the commutation time point is set based on the stored commutation time point. The program then moves on to other processing. When the result in Step 72 is NO, commutation time point setting is not effected and the program moves on to other processing.

In the configuration explained in the foregoing, the presence/absence of a commutation time point setting is checked at every level change of any of rotor position pulse signals ZA, ZB and ZC from the position detection circuit 50 (Step 62), and when no commutation time point is set, computation and setting of a commutation time point with 90° phase lag is effected. On the other hand, when a commutation time point is set, two commutation time points, one with 90° phase lag and one with 30° phase lag, are computed (Steps 64, 65), and, if the commutation time point with 30° phase lag computed in Step 65 has not yet passed, the commutation time point with 30° phase lag obtained in Step 65 is set as the new commutation time point in place of the currently set commutation time point.

The low-pass filter circuits 51–53 thoroughly suppress the chopping frequency component, and the phase lag therein is a function of the instantaneous rotational frequency of the DC brushless motor 10. When no commutation time point has been set, two commutation time points are computed based on the phase lag in the low-pass filter circuit 51–53, one as a commutation time point with a phase lag of 30° and one as a commutation time point with a phase lag of 90°. The DC brushless motor 10 can therefore be operated at the best commutation timing possible in light of its instantaneous rotational speed by using the commutation time point with 30° phase lag whenever it can be computed before the arrival of the commutation time point T30.

The effects of the invention include (a) that the phase delay of the position detection signal is not affected by differences in duty ratio since a large chopping frequency component attenuation rate is secured, (b) that the delay in motor current rise is corrected to facilitate advance of the commutation timing, i.e., facilitate advance control for reducing the phase correction amount, and (c) that position detection is possible at any time during chopping, so that stable operation can be easily realized even under low load when the duty ON period is short, and with minimal load on the microcomputer.

What is claimed is:

1. A method for driving a DC brushless motor having a magnetic rotor and drive windings by supplying the drive windings with chopped drive currents commutated based on voltages induced in the drive windings by magnetic rotor rotation, the method comprising:

a step of obtaining voltage signals representing the induced voltages at a phase lag of 60–90° at maximum rotational speed of the DC brushless motor by passing the induced voltages through low-pass filter means to suppress voltage components occurring due to the chopped drive currents, a step of deriving rotational position data regarding the magnetic rotor from the voltage signals obtained in the obtaining step, a step of setting an optimum time point for commutating the chopped drive currents based on the rotational position data, rotational speed of the DC brushless motor and data regarding a phase lag characteristic of the low-pass filter means, including the steps of:

obtaining data regarding the rotational speed of the DC brushless motor, computing the instantaneous phase lag in the low-pass filter means from the rotational speed data and the data regarding the phase lag characteristic, and correcting the commutation time point based on the computed phase lag and rotational position data to produce a 30° phase lag in a rotational speed range in which the phase lag falls in the range of 0° to less than 30° and to produce a 90° phase lag in a rotational speed range in which the value of the phase lag falls in the range of 30–90° ; and a step of commutating the chopped drive currents at the time point set in the setting step.

2. A device for driving a DC brushless motor having a magnetic rotor and drive windings by outputting commutation control signals for controlling commutation of chopped drive currents supplied to the drive windings based on voltages induced in the drive windings by magnetic rotor rotation, the device comprising:

low-pass filter circuits responsive to voltages obtained from the drive windings and having a phase lag characteristic enabling suppression of a voltage component of the obtained voltages associated with the chopped drive currents and output voltage signals representing induced voltage components at a phase lag of 60–90° at maximum rotational speed of the DC brushless motor, a pulse signal output circuit responsive to an output of the low-pass filter circuit for outputting multiple pulse signals representing rotational position data regarding the magnetic rotor, speed computing means responsive to an output of the pulse signal output circuit for computing a rotational speed of the DC brushless motor, commutation time point setting means responsive to outputs of the speed computing means and the pulse signal output circuit for setting an optimum time point for controlling commutation based on data regarding the phase lag characteristic, comprising:

memory means for storing data corresponding to the phase lag characteristic, phase lag computing means responsive to the speed computing means and the memory means for computing the instantaneous phase lag of the voltages input to the low-pass filter circuits from the drive windings, and correction means for setting an optimum commutation time point by correcting the rotational position data carried by the multiple pulse signals based on the multiple pulse signals and the phase lag computed by the phase lag computing means, wherein the correction means sets the commutation time point to produce a 30° phase lag in a rotational speed range in which the phase lag falls in the range of 0° to less than 30° and to produce a 90° phase lag in a rotational speed range in which the value of the phase lag falls in the range of 30–90°; and control signal output means responsive to an output of the commutation time point setting means for outputting the commutation control signals.

3. A device as claimed in claim 2, wherein the commutation time point setting means further comprises a commutation command section responsive to the correction means for outputting, in accordance with the optimum commutation time point, timing data indicative of the commutation timing of the chopped drive currents supplied to the drive winding.

4. A device as claimed in claim 3, wherein the commutation control signals are output in response to the timing data.

5. A device as claimed in claim 4, wherein an average of voltages applied to the drive windings can be adjusted by adjusting a duty ratio of the commutation control signals.

6. A device as claimed in claim 2, wherein the commutation time point setting means further comprises a commutation command section responsive to the correction means for outputting, in accordance with the optimum commutation time point, timing data indicative of the commutation timing of the chopped drive currents supplied to the drive winding.

7. A device as claimed in claim 6, wherein the commutation control signals are output in response to the timing data.

8. A device as claimed in claim 7, wherein an average of voltages applied to the drive windings can be adjusted by adjusting a duty ratio of the commutation control signals.

* * * * *